May 21, 1957 J. P. LANNEN 2,792,725
AUTOMATIC UNIVERSAL BALANCE TESTING MACHINE
Filed July 26, 1954 5 Sheets-Sheet 1

INVENTOR.
JOSEPH P. LANNEN
BY
ATTORNEY

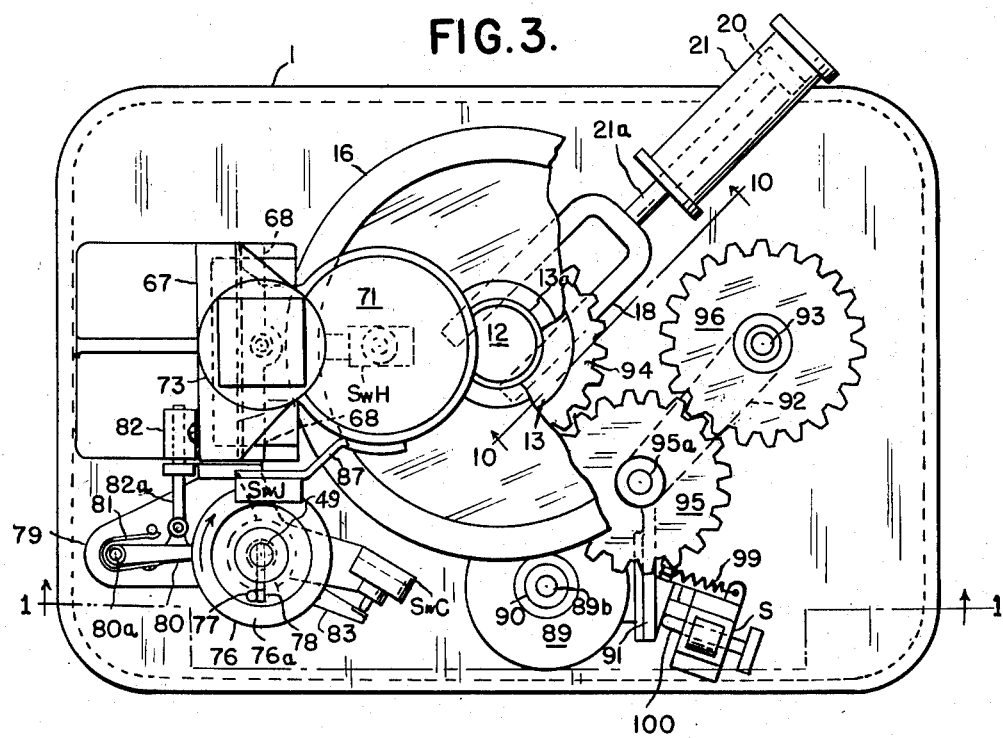
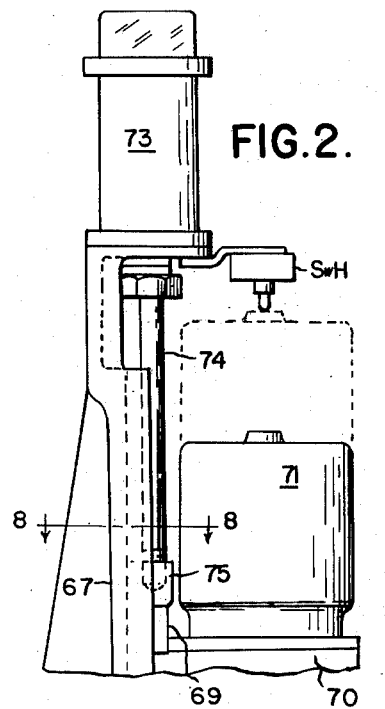
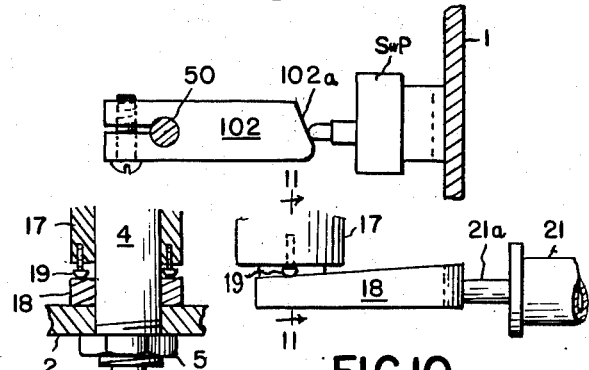

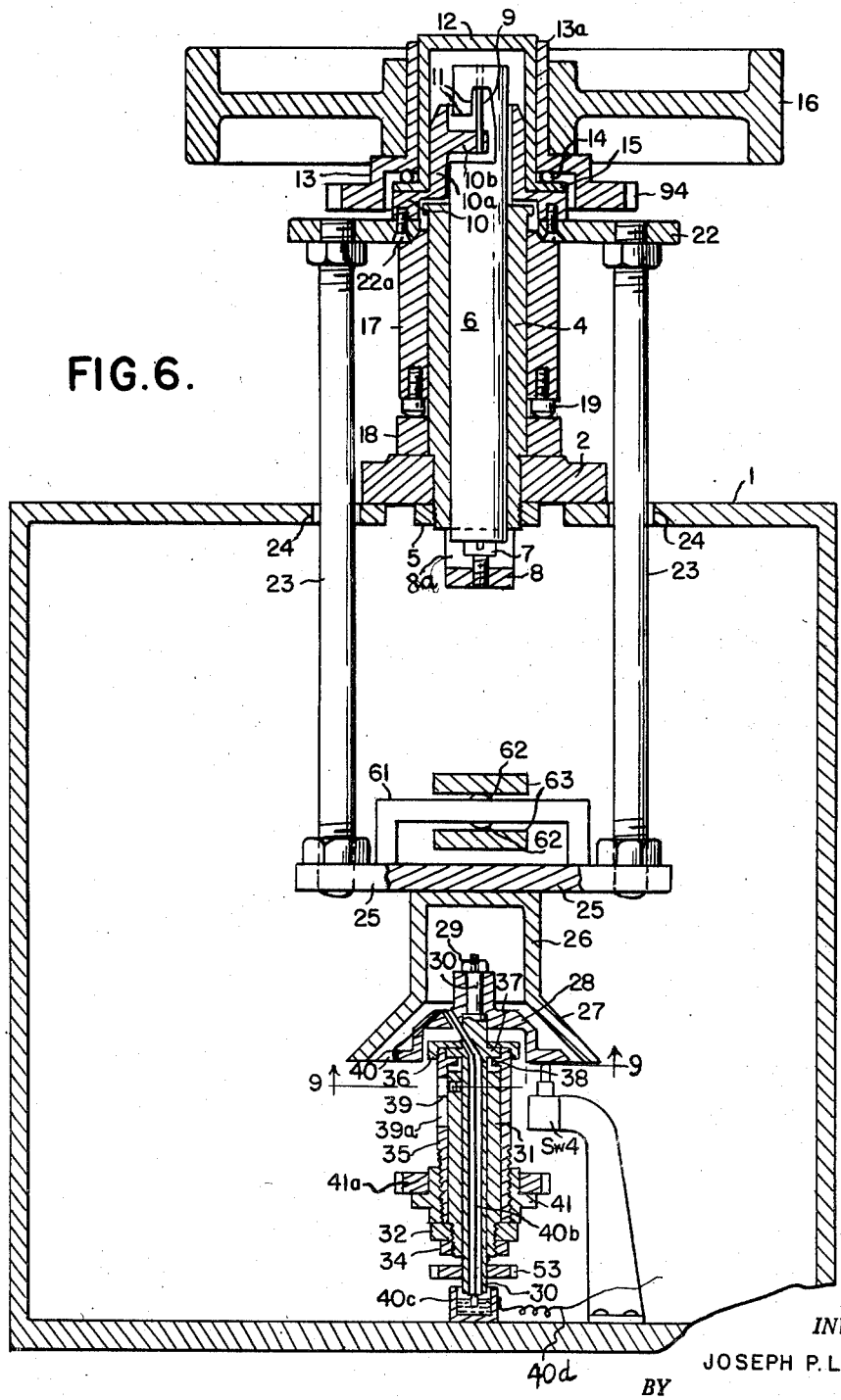

May 21, 1957   J. P. LANNEN   2,792,725
AUTOMATIC UNIVERSAL BALANCE TESTING MACHINE
Filed July 26, 1954   5 Sheets-Sheet 4

INVENTOR.
JOSEPH P. LANNEN
BY
*J. S. Murray*
ATTORNEY

May 21, 1957   J. P. LANNEN   2,792,725
AUTOMATIC UNIVERSAL BALANCE TESTING MACHINE
Filed July 26, 1954   5 Sheets-Sheet 5

INVENTOR
Joseph P. Lannen

BY   J.S. Murray
ATTORNEY of Fig. 1.

United States Patent Office 2,792,725
Patented May 21, 1957

2,792,725

AUTOMATIC UNIVERSAL BALANCE TESTING MACHINE

Joseph P. Lannen, Detroit, Mich., assignor to Micro-Poise Engineering and Sales Company, Detroit, Mich., a partnership Application July 26, 1954, Serial No. 445,749

21 Claims. (Cl. 77—5)

This invention relates to balance testing machines and particularly machines for universally balancing circular work pieces and thus determining the moment and radial location of any unbalanced weight.

Prior machines have relied on gravitational devices such as bubble levels to furnish desired indications. Some machines have carried motorized drills for correcting an indicated condition of unbalance, but these tools have been mere attachments operated independently of the balancing operation.

An object of the invention is to provide a universally pivoted carrier for a work-piece, and to rigidly connect to such a carrier a control head pivotal in unison with the carrier, and to provide a companion control head having a travel so limited by the pivotal head as to predeterminedly vary in extent according to the angular position of the pivotal head.

Another object is to rigidly secure a control head to the universally pivoted work carrier of a balancing machine, and to mount a companion control head to be driven by a motor in a certain path and from a definite starting point to engage the first-mentioned control head, subsequent to pivotal response of the carrier to any unbalance of a work-piece, and to so shape said control heads that travel of the motor-driven head will be proportioned to angular deflection of the pivoted head and hence be proportioned to any unbalance of the work piece, and to drive from said motor a shaft carrying means for indicating, correcting, or otherwise affecting the unbalance of the work piece.

Another object is to form one of said control heads with a chamber opening toward and adapted to receive the other head, such chamber having a conically flared peripheral face to limit travel of the other head and thus proportion such travel to pivotal deflection of the carrier.

Another object is to subject said motor-driven head to a rotary drive from a second motor, to utilize the control heads in conjunction with said rotary drive to indicate the radial direction of tilting of the carrier by an unbalanced work piece, and to drive from the second motor a shaft carrying means for indicating said radial direction.

Another object is to provide means for clamping or otherwise immobilizing the balancing unit formed by the carrier and one of said control heads, in the tilted position of such unit established by an unbalanced work piece, so that interengagement of the two control heads cannot disturb such position.

Another object is to electrically control the operation of a mechanism for automatically immobilizing said balancing unit when tilted in proportion to unbalance of a work-piece.

Another object is to render the operation of a universal balance testing machine automatic by employing one or more electric motor drives and controlling the sequence and timed relation of the various steps of such operation primarily by relays, switches, and solenoids.

Another object is to equip a static balance testing machine with two separate and distinct rotary gaging members for respectively indicating the moment and radial location of unbalanced weight in a work piece.

Another object is to adapt a universal balancing machine to first automatically determine the moment and radial direction of unbalance in a circular work-piece and then automatically correct such unbalance.

Another object is to equip a balancing machine with a motor-driven cutting tool for removing excess material from an unbalanced work-piece, such piece being applied to a universally pivoted carrier and gravitationally inducing a deflection of such carrier proportionate to the moment of unbalance, and such deflection being utilized to automatically determine the cutting travel of said tool and the circumferential point of engagement of the work by such tool.

Another object is to provide for rotative actuation of a work-piece on the carrier of a universal balancing machine, and to rotatively position an indicating element according to the direction of any tilting of the carrier, thus indicating the radial direction of unbalance of the work, and to adapt such element to so limit rotation of the work-piece as to locate the radius of unbalance beneath the cutting axis of a drilling unit for correcting unbalance.

These and various other objects are attained by the construction hereinafter described and illustrated in the accompanying drawings wherein:

Fig. 2 is an upward continuation of the view appearing in Fig. 1.

Fig. 3 is a top plan view of the machine.

Fig. 4 is a view in horizontal section of a switch and its control arm, the section being taken on the line 4—4 of Fig. 1.

Fig. 5 is an elevational view of a cam-controlled switch, as indicated by the line 5—5 of Fig. 1.

Fig. 6 is a vertical sectional view on the line 6—6 of Fig. 1, and showing a balanced position of the balancing unit.

Fig. 10 is a vertical section taken on the line 10—10 of Fig. 3 and showing a sliding cam and its actuating air motor.

Fig. 11 is a cross sectional view of the same taken on the line 11—11 of Fig. 10.

Figure 1:
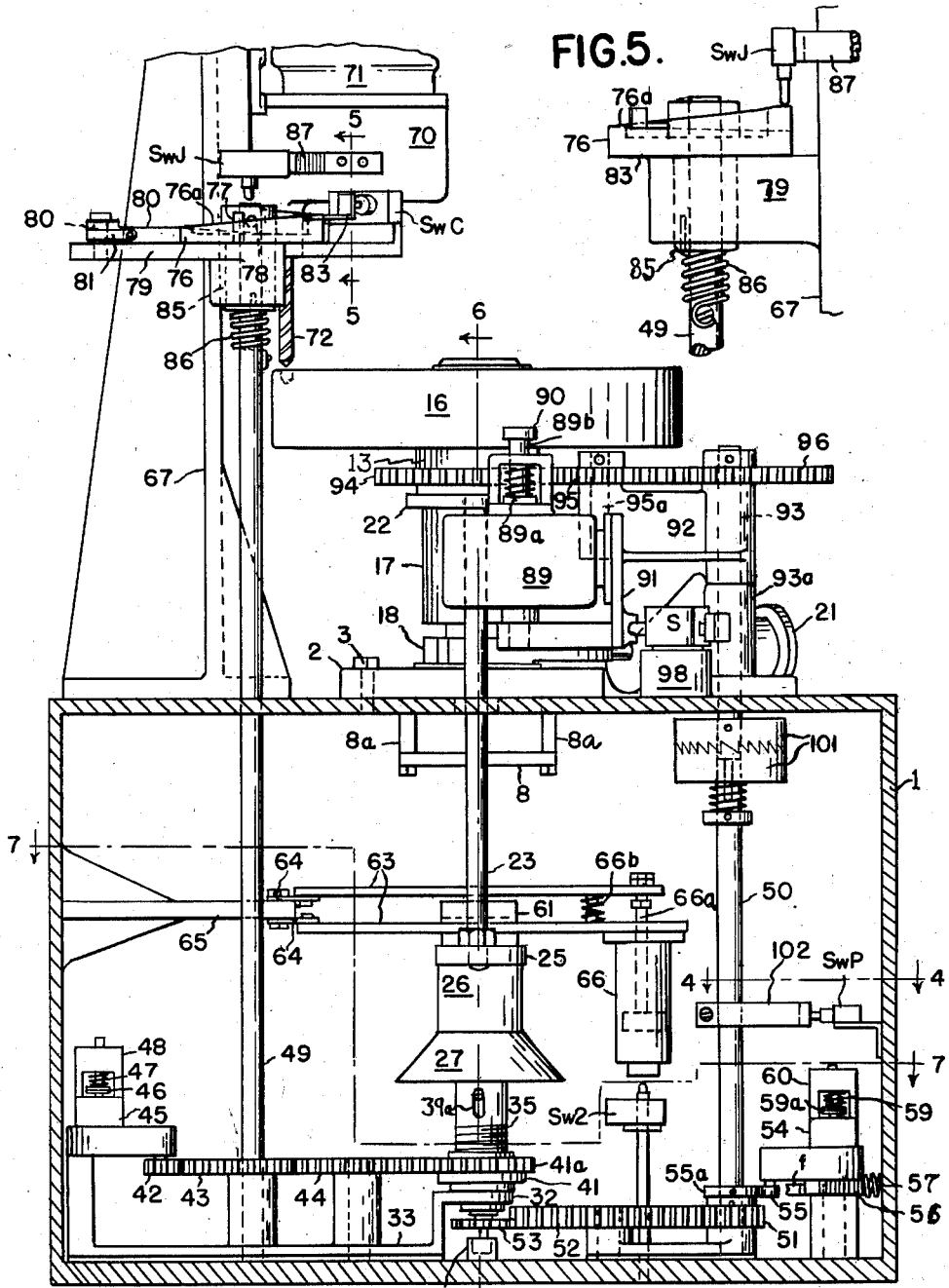
Fig. 1 is a vertical sectional elevational view of the machine taken on the line 1—1 of Fig. 3, an upper portion of the machine being omitted.
Figure 7:
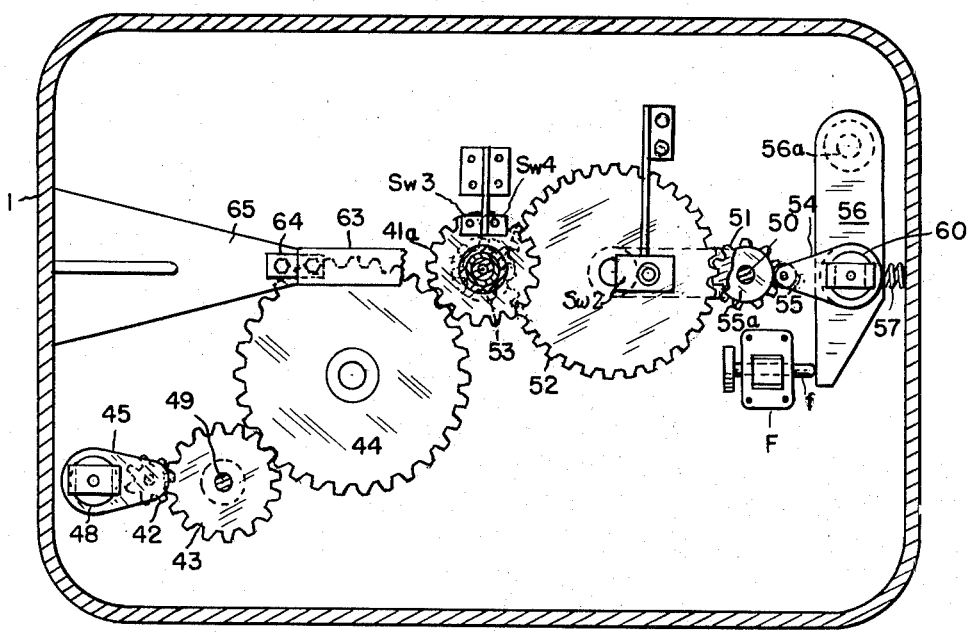
Fig. 7 is a horizontal sectional view on the line 7—7 of Fig. 1, primarily showing certain motors and associated gear trains.
Figure 8:
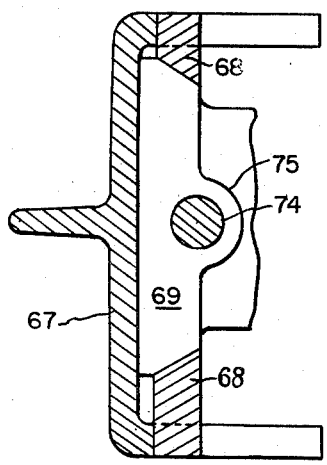
Fig. 8 is a horizontal section taken on the line 8—8 of Fig. 2, and showing guide means for a slide.

In following detailed description, the parts are designated by reference characters applied in the drawings.

Work carrier and its universal pivot

Surmounting the hollow base 1 of the machine is a plate 2 secured in place by bolts 3. Upstanding from such plate is a tubular post 4, clamped to the plate by a nut 5. Slidably fitted in and projecting above the post is a pin 6 seated at its lower end of the head of a screw 7 threaded in a plate 8 carried by lugs 8a rigidly depending from the plate 2. At installation of the machine, the screw 7 may be adjusted to accurately locate the pin 6 at a proper height. Set axially into the top portion of the pin 6 is a short vertical length of flexible wire 9 serving as a universal pivot. The upper end of such wire is carried by the pin and its lower end centrally mounts a work carrier 10 formed with an upstanding hub 10a having an interior lug 10b to which the pivot wire is secured. The carrier hub has sufficient annular clearance from the pin to afford a necessary slight tilting of the carrier and the pin is slotted at 11 to adequately clear the free portion of said wire and afford working clearance to the lug 10b. A cap 12 is slip-fitted on the hub 10a, and the hub 13a of an adapter 13 fits rotatively on said cap. Antifriction means 14 is interposed between the adapter and an exterior annular flange 15 on the cap 12. A circular work-piece 16 is shown slip-fitted on the adapter. A universal pivot of the type described is disclosed in greater detail in my Patent 2,349,288, issued May 23, 1944.

Relief provision for universal pivot

When a work-piece is being applied to or removed from the described carrier, it is desirable to safeguard the pivot wire 9 from resultant stresses which might otherwise damage or break such wire. For such purpose a sleeve 17 slidably embraces the post 4 and may undergo a slight upward actuation responsive to horizontal travel of a U-shaped cam member 18, whose parallel arms straddle said post, such arms supporting the sleeve and slidably seating on the plate 2. The upper edges of said arms have duplicate slight cam inclinations to the horizontal, whereby sliding of the arms in one direction predeterminedly lifts the sleeve and in the opposite direction affords a gravitational lowering of the sleeve. It is preferred to transmit the camming thrust to the sleeve through a pair of buttons 19 seating respectively on the respective cam arms, such buttons being fixed on shanks upwardly inserted in the sleeve. In its raised position the sleeve slightly elevates the carrier 10, thus relieving the universal pivot. As the carrier is thus raised, it will shift the wire 9 slightly upward, stiffness of the wire being sufficient to raise the pin 6. When lowered, the sleeve sufficiently clears the carrier to allow the latter its required pivotal travel. Sliding actuation of the cam member 18 is effected by an air motor comprising a piston 20 and cylinder 21, said piston acting through a rod 21a on the cam member.

Tilting control head

Rigidly secured, as by bolts 22a to and beneath the carrier 10 is a horizontally elongated plate 22 having fixed on its ends a pair of parallel downwardly extending rods 23 which are equidistant from the vertical axis of the universal joint when said carrier is in balance. Said rods extend freely through circular openings 24 in the base 1, affording such swinging of the rods as is incidental to the maximum required tilting of the carrier. Interiorly of the base, the lower ends of the rods are rigidly interconnected by a normally horizontal bar 25. Rigidly and centrally fixed on such bar, therebeneath, is a hollow metallic control head 26 having a frusto-conical lower portion 27, said rods and bar thus forming a support for said head. The interior chamber of the head 26 opens downwardly through the portion 27, conforming to the frusto-conical form of such portion.

It will now be evident that the carrier 10, plate 22, rods 23, and cross bar 25 are included in a vertically elongated balancing unit and that an axis of equilibrium for such unit and the control head 26 is established by the universal pivot 9, and that such axis may diverge from the fixed vertical pivot axis proportionately and responsive to any tilting of the work carrier 10.

Sliding rotary control head

Figure 9:
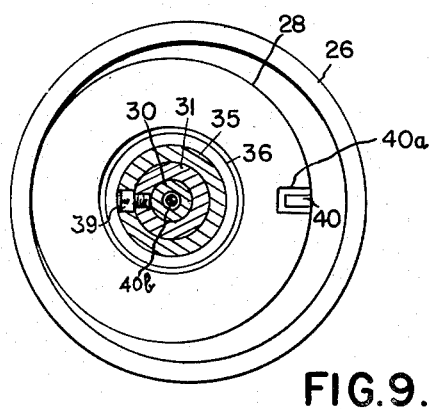
Fig. 9 is a horizontal sectional view taken on the line 9—9 of Fig. 6 and showing the interengaged relation of a pair of coacting control heads.

Coacting with the head 26, within the latter, is a smaller metallic head 28, preferably frusto-conical in form and mounted for travel along the fixed vertical axis determined by the universal pivot 9. Thus the head 28 is rigidly secured by a nut 29 on the upper end of a shaft 30, slidable and rotatable within a tubular post 31 having its lower end screwed into an angular bracket 32 rigidly carried by a plate 33 seated on the floor of the base 1. A nut 34 locks the post 31 rigidly to said bracket. A sleeve 35 is vertically slidable on the post 31, and a cap 36 screwed on the upper end of the sleeve is centrally apertured to accommodate the shaft 30 and engages above an annular flange 37 on such shaft. An interior annular flange 38 on the sleeve engages beneath the flange 37, the arrangement being such that the shaft and sleeve form a unit for sliding travel, while the shaft is rotatable independently of the sleeve. To afford the sleeve sliding travel while preventing its rotation, a screw 39 threaded in and radial to the post 31 is headed within a slot 39a vertically elongated in the sleeve. The head 28 overlies the sleeve and is preferably recessed to accommodate the cap 36. The head 28 has its circular periphery radially notched to receive and rigidly mount (Fig. 9) a contact element 40 which is insulated from said head as indicated at 40a. The function of said element is hereinafter explained. An insulated conductor 40b extends from the element 40 downwardly through the shaft 30 to a mercury cup 40c maintaining the connection to a conductor 40d, despite actuation of said shaft.

Drive mechanisms for sliding rotary head

The lower portion of the sleeve 35 is exteriorly screw-threaded and engaged by a feed nut 41 seating freely on the bracket 32. Fixed on such nut is a gear 41a included in a gear train 42, 43, 44, 41a driven from a reversible electric motor 45. The latter is equipped with a known type of brake 46 applied by a spring 47 immediately upon deenergization of the motor and released by a solenoid 48 concurrently closing of the motor circuit. The gears 41a and 43 are proportioned to turn at the same speed, and the gear 43 is fixed upon and drives a vertical shaft 49. When the motor 45 is energized, the unit comprising the head 28, shaft 30, and sleeve 35 is fed upwardly or downwardly by the nut 41, according to direction of the motor drive. In its lowered position, the head 28 actuates switches Sw3 and Sw4 (Figs. 1 and 2) as hereinafter fully explained.

The shaft 30 is adapted to be rotatively driven from a vertical shaft 50 through a gear train 51, 52, 53, the gear 53 being relatively thin to remain in mesh with the gear 52 throughout sliding travel of the shaft 30. The shaft 50 is driven from a constant directional electric motor 54 through a pair of friction wheels 55 and 55a. For reasons hereinafter set forth, it is at times necessary to separate the wheels 55 and 55a, this being permitted by mounting the motor 54 on an arm 56 pivoted at 56a and urged toward the shaft 50 by a coiled spring 57. Thus said spring determines the pressure reacting between the two friction wheels. A solenoid F coacts at f with the free end of the arm 56, the latter being swung to separate the friction wheels upon energization of such solenoid. Similarly to the motor 45, the motor 54 is equipped with an automatic brake 59a urged to a set position by a coiled spring 59 taking effect immediately on deenergization of the motor and releasable by a solenoid 60 concurrently with starting the motor. The gears 51 and 53 are of equal diameter assuring the same rotational speed for the shafts 30 and 50.

Clamp to maintain deflection of balancing unit

When the universal pivot 9 is under load, a work piece applied to the carrier 10 will tilt, together with the balancing unit including such carrier, in a direction and to a degree determined by any unbalance of the work-piece. In case such piece is perfectly balanced, no tilting will occur. The pivotal position which the balancing unit assumes during testing of a work piece must be accurately maintained during certain subsequent operations hereinafter explained and there will now be described a provision for clamping and thus immobilizing such unit firmly in such position. Rigidly surmounting the bar 25 is an arched clamping element 61 elongated in parallelism with said bar. Said element centrally and rigidly carries a pair of spherically rounded knobs 62, oppositely projecting upwardly and downwardly. Extending across the element 61 and disposed respectively above and below the knobs 62 are a pair of vertically spaced clamping levers 63 having corresponding ends thereof mounted by plates 64 on a horizontal arm 65 rigidly projecting from the wall of the base. The plates 64 have a resilient flexibility adequate to fulcrum the levers 63 for a slight swinging travel to and from each other. The lever ends remote from their fulcrums respectively carry a cylinder 66 and piston rod 66a of an air motor. Air delivery to and from the cylinder is hereinafter explained. When compressed air is admitted to the cylinder 66, the paired levers are urged sufficiently toward each other to firmly clamp the element 61, thus maintaining any position assumed by the balancing unit comprised by the work carrier 10, plate 22, rods 23, and bar 25. The knobs 62 adapt the levers to function in any universally pivotal position which said unit may assume. A coiled spring 66b reacting between the levers 63 relieves the element 61 of any clamping restraint when the air motor is de-energized. A microswitch Sw2 is so positioned beneath the cylinder 66 as to be controlled by the latter in its up and down travel, the function of such switch being hereinafter explained.

*Drilling unit for correcting unbalance of work*

Rigidly upstanding from the base 1 is a pedestal 67 carrying a pair of spaced vertically elongated gibs 68, forming guides for a slide 69 in its up and down travel. A gear box 70, rigidly projecting from the slide and upwardly spaced from the work-piece 16, is surmounted by a motor 71 serving to drive a downwardly projecting drill bit 72. Such bit is disposed above the work-piece rim for removing material from such rim, upon an adequate downward actuation of the drilling unit 70, 71, 72. For such actuation, the cylinder 73 of a compressed air motor surmounts the pedestal 67, and the downwardly projecting piston rod 74 of such motor is secured at 75 to the slide 69. Vertical travel thus afforded the drilling unit largely exceeds any required cutting stroke of the bit, since the raised position of said unit, indicated in dash lines in Fig. 2, must establish a clearance adequate for applying work to and removing it from the adapter 13. In said raised position, the drilling unit encounters and actuates a microswitch SwH whose function is hereinafter explained.

*Regulation of down travel of drilling unit*

There will now be described a gaging mechanism whereby downward actuation of the drilling unit is so regulated as to proportion the cut taken by the bit 72 to up travel of the control head 28. Since such travel is controlled by and proportionate to the moment of unbalance of the work, said mechanism serves to proportion the effective stroke of the bit to the moment of work unbalance and hence to correct unbalance of the work. The vertical shaft 49 has a portion extending above the base 1 in proximity to the pedestal 67, and the upper end of such shaft mounts a cam 76 formed on its top face with a helical camway 76a, having preferably a 360 degree extent. Said cam is afforded a limited rotation relative to the shaft and receives a clockwise drive from the shaft through relatively transverse pins 77 and 78 carried respectively by said cam and shaft. The cam seats rotatively on a shelf 79 laterally and rigidly projecting from the pedestal 67, and a detent 80 pivoted at 80a on said shelf projects toward said cam and normally frictionally engages the cam periphery at a point slightly advanced clockwise (Fig. 3) beyond the vertical plane jointly determined by the cam axis and pivot of the detent. A spring 81 urges the detent pivotally toward said plane, whereby the cam is locked normally against counter-clockwise rotation, while free to travel clockwise. On the outer face of the pedestal is mounted a solenoid 82, whose sliding core 82a is prolonged to pivotally engage the detent 80, whereby a release of the detent results from energization of the solenoid. Outwardly rigidly projecting from the cam periphery is an arm 83 which encounters and opens a normally closed microswitch SwC when the cam, after exercising its regulating function, is returned by counter-clockwise rotation to its idle position. The control exercised by the switch SwC is hereinafter explained. The cam has a downwardly projecting hub 85 to which is connected the upper end of a torsion spring 86 coiled on the shaft 49 and secured at its lower end to such shaft. The described arrangement is such that the spring 86 will not be materially stressed when the shaft and cam are rotated clockwise in unison to establish the regulating position of the cam. The cam, however, will be maintained in regulating position by the detent 80, during a rotative return of the shaft to its normal position, such return imposing a sufficient stress on the spring 86 to subsequently energize a return travel of the cam when permitted by retraction of the detent.

A bracket 87 rigidly carried by the drilling unit mounts a microswitch SwJ, so disposed above the camway 76a as to receive a control from the latter at completion of down travel of such unit. As is hereinafter more fully explained, the control applied by the cam to the switch SwJ reverses operation of the air motor 73, 74 and thus returns the drilling unit to its upper limit. Also response of said switch to the cam 76 closes a circuit through the solenoid 82 causing the detent 80 to disengage the cam, and thus permitting the spring 86 to rotate the cam to its normal position established by interengagement of the pins 77 and 78.

*Rotation of work preliminary to drilling*

An electric motor 89, equipped with a solenoid-controlled brake 89a and having a vertical shaft 89b, serves to rotate the work-piece in unison with its adapter 13 upon their anti-friction support 14, the driving means including a friction wheel 90 fixed on said shaft. To control such drive, the motor is carried by a vertical plate 91 forming the free end portion of an arm 92 pivoted on the upper end portion of a vertical shaft 93 journaled in a bearing 93a surmounting the base 1. The weight of the work, as seated on the adapter, suffices to drive the adapter in unison with the work. Fixed on the adapter adjacent to and beneath the work, is a gear 94 adapted to mesh with an idler gear 95 whose shaft 95a is mounted on the mid portion of the arm 92. The idler gear meshes with a gear 96 fixed on the shaft 93 above said arm. Adjoining the plate 91 is a solenoid S rigidly surmounting a boss 98 upstanding upon the base 1. A spring 99, interconnecting said plate and the solenoid frame, tends to swing the arm to its position shown in Fig. 3, in which the friction wheel 90 clears the work-piece and the gear 95 is materially retracted from the gear 94. Such retraction is sufficient to avoid interference with any requisite tilting of the work about the universal pivot 9, but maintains a sufficient lapping of the teeth of the two gears to avoid any possible clashing when the gears are again fully intermeshed. The solenoid S has a plunger core 100 bearing on the arm 92 and adapted when actuated, to overcome the spring 99 and fully intermesh the gears 94 and 95, while shifting the friction wheel 90 and its motor to a work-driving position.

The shaft 93 is aligned with and closely adjoined to the shaft 50 and coupled to the latter by an overrunning clutch 101 (see Fig. 1) such as to maintain a drive from the upper to the lower shaft, while affording the latter a rotation independent of the former. An arm 102 fixed on the shaft 50 has at its free end a cam face 102a for controlling a microswitch SwP interiorly mounted on the base 1 and opposed to the axis of the drilling unit in a vertical plane diametrical to the universal pivot 9. The arrangement is such that the arm 102, upon rotating counterclockwise and encountering the switch SwP, actuates the latter to deenergize the motor 89, as hereinafter more fully explained. Upon deenergization, the motor comes to an immediate stop due to its brake 89a. It is an important feature of the described mechanism that the arm 102, in any rotative position thereof, projects from its shaft 50 in a direction opposite to that radius of the head 28 which is established by the contact element 40. This relation is maintained by the gearing 51, 52, 53.

*Mechanical steps comprising a balancing operation*

At commencement of an operating cycle, the arm 92 is positioned to interengage the gears 94 and 95 and dispose the friction wheel 90 in driving contact with the work-piece 16. Also the sleeve 17 is raised to relieve the universal pivot 9 of load. Following disposal of a work-piece on the adapter 13, the arm 92 is swung as per Fig. 3 to separate the gears 94 and 95 and retract the friction wheel 90, and at same time the arm 56 is swung to interengage the friction gears 55 and 55a. It is here again to be noted that the teeth of the gears 94 and 95 remain interlapped when the gears are separated, assuring their proper intermeshing when again a drive is required. The air motor 20, 21, 21a is now operated to lower the sleeve 17, allowing the universal pivot to function. If the work-piece is to any extent unbalanced, there results a tilting of the balancing unit, the degree of such tilting measuring the amount of unbalance of the work, and the radial direction of such tilting indicating the radius along which unbalanced weight is effective. A short time lag is now afforded for cessation of any oscillation of the balancing unit. The next step consists in admitting air to the cylinder 66 and thus deriving a clamping function from the levers 63 to securely maintain such position as the balancing unit has pivotally assumed. Unless the work-piece is perfectly balanced, the balancing unit will be clamped in a more or less tilted position.

The motors 45 and 54 are now energized, the former acting through the gear train 42, 43, 44 and 41a to rotate the feed nut 41, and the latter rotatively driving the shaft 30 through friction wheels 55 and 55a and gear train 51, 52, 53. The shaft 30 and control head 28 are thus concurrently raised and rotated, and presently said head encounters the control head 26. Such encounter automatically deenergizes the motor 45, as hereinafter explained, leaving the two heads in contact. Such contact is ordinarily at a single point due to usual relative eccentricity of the two heads, best seen in Fig. 9. If the contact element 40 encounters the head 26, the motor 54 will be immediately deenergized. In most instances, however, some other point of the lower head will contact the upper one, the motor 54 then remaining energized until rotation of the head 28 has engaged said contact element with the upper head. These electrical controls are hereinafter explained. It must now be understood that uptravel of the head 28 is a variable decreasing in amount as the angle of tilt of the head 26 increases, since initial or maximum clearance between the two heads is reduced in proportion to the angle through which the upper head is tilted. It follows that upward travel afforded the lower head is inversely proportionate to the angular deflection of the balancing unit, such deflection being proportionate to the moment or inch-ounces of unbalance. To utilize these proportions, the shaft 49 and the cam 76 thereon are driven at a speed equaling that of the feed nut 41, such cam controlling the lower limit of the drilling unit and hence controlling the amount of material removed by such unit. Initially the camway 76a presents its lowest point to the switch SwJ, the measuring rotation of the cam progressively presenting higher points to the switch. Since the cam takes effect at the vertical axis of such switch, and its rotation is proportionate to uptravel of the control head 28, it follows that the cam may be designed so that its effective height increases as uptravel of said head increases. Hence when the cam rotation ceases concurrently with uptravel of the head 28, the effective cam height exactly measures uptravel of said head. The cam is hence a gaging element for measuring the amount or moment of any unbalance of the work. This measurement while serving to establish a proper drilling depth, is not immediately utilized, it being necessary to first rotate the work to locate its radius of unbalance accurately beneath the drill bit.

The motor 45 is now reversely energized to return the control head 28 to its normal position. The shaft 49, while participating in this reverse rotation, does not disturb the cam 76, the latter being held fixed by the detent 80. The torsion spring 86 is stressed during the described reverse rotation, thus storing energy for later restoring the initial position of the cam. As the head 28 completes its downward travel, the motor 45 is automatically deenergized as hereinafter more fully described.

By now exhausting air from the cylinder 66, the clamping force applied by the levers 63 to the balancing unit is relieved, such levers being diverged slightly by the coiled spring 66b. The direction of thrust exerted by the air motor 20, 21, 21a is now reversed, whereby the sleeve 17 is sufficiently raised to restore and maintain a level position of the work and carrier, while relieving the universal pivot of load.

The next step consists in rotating the work, together with its adapter, through such an angle as will locate the radius of unbalance accurately beneath the drilling axis of the drilling unit. Preliminary to such rotation, the solenoid S is energized to swing the arm 92 toward the work, thus intermeshing the gears 94 and 95 and operatively engaging the friction wheel 90 with the work. Also the solenoid F is energized to separate the friction wheels 55 and 55a. The motor 89 is now energized, acting through the friction wheel 90 to rotate the work. Since the work seats on the adapter 13, the latter turns in unison with the work. The gear train 94, 95, and 96 drives the shaft 93, turning the latter at a speed and in a direction identical with those of the work. The shaft 93 transmits its drive through the overrunning clutch 101 to the shaft 50, whereby the arm 102 is driven in unison with the work, and maintains its 180 degree relation to the radius of unbalance of the work. Hence when such radius arrives beneath the drilling axis, the arm 102, projecting along an extended radius of the work 180 degrees removed from the axis of unbalance, encounters and actuates the switch SwP, since such switch is opposed diametrically of the work to the drilling axis. The motor 89 being deenergized by said switch, the work remains properly positioned for drilling.

To effect drilling, air is admitted to the upper end of the cylinder 73 causing the piston rod 74 to downwardly drive the slide 69 carrying the drilling unit. The microswitch SwH is permitted to close as the drilling unit descends, and energization of the drill motor 71 results. When the microswitch SwJ encounters the cam 76, down travel of the drilling unit immediately ceases and uptravel thereof commences. The control thus exercised over the air motor 73, 74 by the switch SwJ is hereinafter more fully explained. It has been previously explained that the cam 76 presents to the switch SwJ a point on its helical camway elevated through cam rotation a distance determined by and equal to uptravel of the control head 28, such uptravel being inversely proportionate to the moment of unbalance characterizing the work-piece under test. Thus the material removed by the bit 72 is so measured by the cam as to accurately correct any unbalance of the work-piece.

When the drilling unit reaches its intended raised position, the microswitch SwH is encountered, such switch exercising the multiple functions of deenergizing the drill motor 71, the air motor 73, 74, and the solenoid 82. The detent 80 now takes effect on the cam 76, preparatory to the next operating cycle. The tested and corrected work-piece may now be removed from the machine.

*Electrical diagram and complete operation*

In the diagram, a pair of alternating current mains 104 and 104' have shunts 105' and 106' including transformers 105 and 106, energized throughout use of the machine. Said transformers step down the voltage employed in certain circuits thus minimizing the possibility of shock or current leakage. After depositing a workpiece on the adapter 13, the operator momentarily opens a normally closed switch Sw1, initiating a complete cycle of operation, whereof the various steps are automatically performed in proper sequence. Such switch controls the coil of a relay R1 having sets of contacts R1a, R1b, R1c and R1d. Prior to opening said switch, circuits through the solenoids S and F are closed at R1a and R1b, and at R1c a circuit through the relay coil is completed. Also, at R1d a circuit 105a energized by the transformer 105 and including the coil 107b of a differential solenoid 107, is opened.

Upon opening said switch and thus deenergizing the relay coil, the circuits through solenoids S and F are broken at R1a and R1b, permitting the gear 95 and friction wheel 90 to be retracted by the spring 99, and permitting the spring 57 to interengage the friction wheels 55 and 55a. Also, at R1d, there is closed the circuit through the coil 107b, whereby a valve 110 is operated to actuate the piston of the air motor 20, 21, 21a, in a direction to lower the sleeve 17 and thus load the universal pivot 9. At R1c, the circuit of the relay coil is broken, such coil thus remaining deenergized despite closing of the switch Sw1, following its momentary actuation. Also there is closed at R1c a circuit 111 through the coil of a time delay relay R2, the delayed action thereof affording an interval for cessation of any oscillation affecting the balancing unit due to functioning of the universal pivot. Thus the balancing unit comes to rest in a position induced by the moment of unbalance, if any, characterizing the work-piece 16. The normally open contact of the relay R2 is now closed to energize a solenoid 112 controlling a valve 113 which in turn admits air to the motor 66, 66a, thus applying to the balancing unit the clamping levers 63. As has been explained, the clamp is designed to function in any position, vertical or tilted, which said unit may assume. In actuating the levers 63, the cylinder 66 is raised sufficiently to clear the underlying microswitch Sw2, permitting the latter to assume its normally closed position. This energizes the motor 45 through its field 45a in a direction to drive the head 28 upwardly, and also energizes the motor 54 for rotating said head. As traced from the switch Sw2, the energizing circuit of the motor 54 is as follows: lead 114, contact R3b of triple contact relay R3, line 115, contact R5b of a dual control relay R5 of time delay type, line 117, motor 54, relay contact R3a, and lead 118. As similarly traced, the motor 45 is energized through lead 114, relay contact R3b, line 115, relay contact R5b, lines 117 and 117a, contact R4a of a dual control relay R4, line 120, motor coil 45a, line 121 and main 104.

Being upwardly driven by the motor 45, and concurrently rotated by the motor 54, the head 28 presently impacts the head 26. Such impact may be at the contact element 40 but will much more commonly be applied by the metallic body of the head 28. If the element 40 makes contact, there is closed a circuit 122, 122a energized by the transformer 106 and including the relay coil R3. Energization of said coil serves to open the contacts R3a and R3b and deenergize both motors 45 and 54, thus cutting off both the upward and rotary drives to the head 28. If impact of the two heads occurs at some point other than the element 40, the upper coil of R4 will be energized through the conductors 123 and 122a whereby the circuit of the motor 45 will be broken at R4a to cut off the upward drive to the head 28. At R4b there will be closed a circuit through the normally raised switch Sw3 to energize the coil of a time delay relay R5. Traced from the contact R4b, such circuit includes a line 124, Sw3, lines 125 and 126, relay coil R5, and lines 127 and 121.

Upon energization of R5, there is a delay in actuation of its contacts adequate for completion of any such rotation of the head 28 as may be necessary for contact of the element 40 with the head 26. The contact R5a then closes while contact R5b opens. R5a closes a circuit which may be traced as follows: line 121, reversing coil 45b of motor 45, line 121a, contact R5a, line 125, switch Sw3, line 124, and contact R4b. The motor 45 now drives the head 28 downward. The circuit broken at R5b comprises the motor 54 and the coil 45a of the motor 45. Thus it is assured that the motor 54 and the updrive coil of motor 45 will be deenergized as the head 28 travels down. In reaching its lower limit, the head 28 downwardly actuates the contact of switch Sw3, thus deenergizing the motor 45, and stopping its reversing or head-lowering drive. In opening the described motor circuit, the switch Sw3 closes a circuit through the coil R4' of relay 4, whereby the contact R4a is unlatched.

In reaching its lower limiting position, the head 28 furthermore closes the normally open switch Sw4, which then energizes the coil of a time delay relay R6. The normally open lower contact R6b of such relay is thus closed, energizing a circuit including series-connected lines 129 and 130 and the coil relay R1. The contact R1c, in responding to the coil, closes a holding circuit through the latter, while breaking a circuit through the relay coil R2. The contact of R2 now springs open, deenergizing the solenoid 112 and thus adapting the valve 113 to exhaust air from the air motor cylinder 66. Responding to the spring 66b, the levers 63 now release the balancing unit, leaving it free to respond to the universal pivot 9. Energization of R1 also opens the circuit 105a at R1d deenergizing the solenoid coil 107b, and concurrently the solenoid coil 107a is energized through a circuit 131 closed at R6a and energized by the transformer 105. Resultant operation of the solenoid-controlled valve 110 raises the sleeve 17 and relieves the pivot 9 of load.

Figure 12:
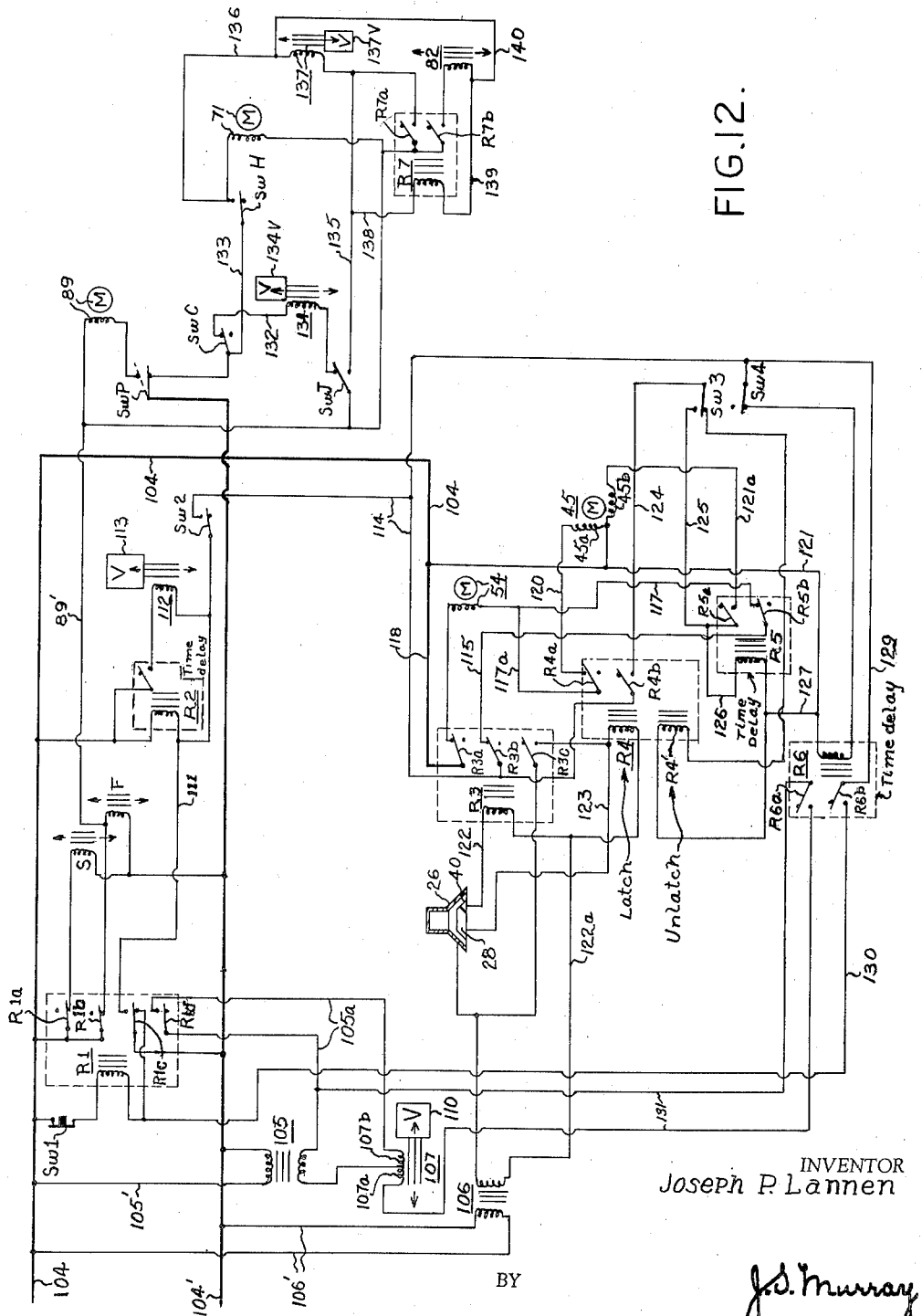
Fig. 12 is a diagram of the electrical circuit, the switches and relay contacts being shown as positioned at commencement of a cycle.

Due to energization of R1, the circuits of solenoids S and F are closed respectively at R1a and R1b. At R1b there is also closed, through a line 89', the circuit of the motor 89. The solenoid S establishes a drive from said motor to the work 16, and the solenoid F separates the friction wheels 55 and 55a, as has been described. The work is thus rotated by the motor, and the shaft 93, driven from the work by gearing 94, 95, 96 transmits its drive to the shaft 50 through the overrunning clutch 101. When the arm 102 fixed on the shaft 50 encounters the double throw switch SwP, the latter assumes its full line position (Fig. 12) breaking the motor circuit. Due to its brake 89a, the motor stops immediately, leaving the switch SwP held by said arm in said full line position. As has been explained, the location of said switch is such as to assure disposal of the radius of unbalance of the work, upon cessation of its drive, in an intersecting relation to the cutting axis of the drill. Throughout the balance of the cycle the arm 102 maintains its described relation to the switch SwP.

The switch SwP in stopping the motor 89, closes two other circuits 132 and 133. The circuit 132 includes a solenoid 134 operating a valve 134V so controlling the compressed air motor 73, 74 as to induce down travel of the drilling unit 70, 71, 72 when such solenoid is energized. The circuit 133 includes the drilling unit motor 71 and further includes the switch SwH (normally closed) as a control for such motor. As the drilling unit starts down, the switch SwH is permitted to close, setting up the described motor drive to the bit 72. The circuit 132 is additionally controlled by the normally closed switch SwJ, traveling with the drilling unit, such switch deenergizing said circuit upon encountering the cam 76, which predetermines the depth of cut.

Further controlling the circuit 132 is the normally closed switch SwC. Such switch is held open by the arm 83 of the cam 76 in the normal or non-measuring position of such cam, but is permitted to close responsive to any rotative advance of the cam. Said switch remains closed during drilling, since the cam is then retained in a measuring position by the detent 80.

When the switch SwJ encounters the cam, such switch breaks the circuit 132, thus deenergizing the solenoid 134 and adapting the valve 134V to discontinue the down drive applied by the air motor 73, 74. As thus actuated the switch SwJ closes a circuit including lines 135 and 136 and a solenoid 137 operating a valve 137V. Energization of such solenoid positions the valve to deliver compressed air to the lower end of the cylinder 73, initiating an upward retraction of the drilling unit. A relay R7 is now energized through lines 138, 139, and 140, closing normally open contacts R7a and R7b. At R7a there is maintained energization of the relay throughout retraction of the drilling unit, since the switch SwJ assumes its normal position opening the line 135 as soon as such retraction begins. At R7b, there is closed a circuit energizing the solenoid 82 which now retracts the detent 80, allowing the torsion spring 86 to return the cam 76 to its initial position. In such position, the switch SwC is opened by the cam arm 83, maintaining deenergization of the solenoid 134, despite closing of the circuit 132 at SwJ. Said solenoid must be deenergized to permit upward retraction of the drilling unit.

In reaching its upper limiting position, the drilling unit encounters and opens the switch SwH, thus deenergizing the drill motor 71, solenoid 137, relay R7, and solenoid 82. Deenergization of solenoids 137 and 82 serves respectively to deenergize the air motor 73, 74 and to allow the detent 80 to take effect on the cam 76. The cycle being completed, the work-piece 16 is now removed, its balance having been tested and, if necessary, corrected.

It is to be noted that momentary energization of the coil of relay R6 occurs upon closing the switch Sw2, since at time of such closing, the head 28 is at its lower limit and hence closes the switch Sw4. However, as Sw2 closes, the motors 45 and 54 are started and an immediate uptravel of the head 28 results, permitting Sw4 to open and break the circuit of R6. Retardation of R6 allows time for such circuit-breaking in advance of any response of contacts R6a and R6b to the described momentary energization of said relay.

By rendering the operations of testing a work-piece and correcting any unbalance thereof fully automatic, the described machine minimizes the time required for such operations and the skill required of an operator. By largely eliminating the possibility of carelessness and mistakes, considerably more accurate results are achieved and loss due to spoilage is avoided. The long radius afforded the head 26 in its swinging travel about the universal pivot magnifies such travel as compared to any tilting of the work-piece and so lends itself to accurate indications and to the measurement of small moments of unbalance.

Vital to the coacting relation of the control heads 26 and 28 are the normal coaxial relation of these heads and the frusto-conical form of at least one thereof. Such form permits both the horizontal and vertical clearance between the heads to be varied proportionately to the tilting of one thereof, so that the upward travel of the other head, required to take up the remaining clearance, serves to measure such clearance and the force inducing its variations.

While a drilling tool has been exemplified for removal of excess material, it is to be understood that certain other cutting tools may serve the purpose and for some types of work may be preferred. The bit 72 may be considered to exemplify a marking as well as a cutting element, since it may be preferable or more practicable after testing some types of work to merely mark the points where correction is required.

What I claim is:

1. A universal balance testing machine, comprising a balancing unit including a work carrier and a support rigidly downwardly extending from such carrier, a universal pivot mounting the unit and engaging its upper portion and establishing a fixed vertical axis and also an axis of equilibrium for the unit, such axes coinciding when the unit is in balance, a first control head fixed on the support at said axis of equilibrium, a second control head slidable up and down along said fixed axis to engage and disengage the first head, one of said heads having a circular periphery and the other head presenting to such periphery a substantially frusto-conical face, means for guiding the second head in its sliding travel and for restraining it from material lateral travel, means for definitely limiting retraction of the second head from the first head and thus determining a maximum available clearance between the heads, the travel afforded the second head by the first head varying according to the divergency of said axes, means for gaging the moment of unbalance of a work-piece on said carrier, and a mechanism for actuating the second head in its sliding travel and proportionately actuating an element of said gaging means.

2. A universal balance testing machine as set forth in claim 1, said actuating mechanism including a motor and means for deenergizing such motor responsive to engagement of the first head by the second head.

3. In a universal balance testing machine as set forth in claim 1, said actuating including an electric motor, a circuit for such motor, and means for breaking such circuit responsive to engagement of the first head by the second head.

4. A universal balance testing machine as set forth in claim 1, said support including a pair of rods secured to the carrier in a substantially equal and substantially opposite spaced relation to said axis of equilibrium, and a bar rigidly interconnecting the lower portions of such rods and fixedly carrying said first control head.

5. In a universal balance testing machine as set forth in claim 1, a clamp engageable with the balancing unit to maintain any deflection of such unit induced by an unbalanced work-piece, and actuating means for such clamp.

6. In a universal balance testing machine as set forth in claim 1, a clamp engageable with the balancing unit to maintain any deflection of such unit induced by an unbalanced work-piece, a fluid motor for actuating such clamp, and means for electrically controlling such motor.

7. In a universal balance testing machine as set forth in claim 1, a clamping element fixed on the lower portion of said support, a pair of clamping levers extending respectively above and below said element, means fulcruming the levers at corresponding ends thereof, and means engaging the other ends of the levers for stressing them against said element to maintain any deflection of the balancing unit.

8. A universal balance testing machine, comprising a balancing unit including a work carrier and a support rigidly downwardly extending form such carrier, a universal pivot mounting the unit and engaging its upper portion and establishing a fixed vertical axis and also an axis of equilibrium for the unit, such axes coinciding when the unit is in balance, a first control head fixed on the support at said axis of equilibrium, a second control head slidable up and down along said fixed axis to engage and disengage the first head, one of said heads having a circular periphery and the other head presenting to such periphery a substantially frusto-conical face, means for guiding the second head in its sliding travel, means for definitely limiting retraction of the second head from the first head and thus determining a maximum available clearance between the heads, the travel afforded the second head by the first head varying according to the divergency of said axes, a tool reciprocatory to and from a work-piece on said carrier to remove excess material from such work-piece, means for guiding such tool in its reciprocation, a motor for effecting such reciprocation, and means for regulating the effective stroke of the tool according to sliding travel afforded the second control head.

9. In a universal balance testing machine, as set forth in claim 8, means for automatically deenergizing said motor responsive to a predetermined retraction of the tool.

10. A universal balance testing machine comprising a work carrier and a universal pivot mounting such carrier, such pivot affording the carrier an angular deflection about any diameter thereof, such deflection being determined in degree by the moment of any unbalance of the work, a cutting tool reciprocatory to remove excess material from an unbalanced work-piece on said carrier, and means for automatically regulating the effective stroke of such tool according to the angular deflection of said carrier.

11. A universal balance testing machine comprising a balancing unit including a work carrier and a support rigidly downwardly extending from such carrier, a universal pivot mounting the unit and engaging its upper portion and establishing a fixed vertical axis and also an axis of equilibrium for the unit, such axes coinciding when the unit is in balance, a first control head fixed on the support at said axis of equilibrium, a second control head slidable along said fixed axis to engage and disengage the first head, one of said heads having a circular periphery and the other presenting to such periphery a substantially frusto-conical face, whereby sliding travel afforded the second head is variably limited by the first head according to any divergency of said axes, means for guiding the second control head in its sliding travel, means for definitely limiting such travel in its direction from the first head and thus predetermining a maximum clearance between the heads, a motor for actuating the second head in its sliding travel, means for deenergizing such motor responsive to interengagement of said heads, an actuable device for gaging the moment of unbalance of a work-piece on said carrier, a mechanism for actuating such device from the motor, whereby such actuation is regulated by sliding travel of the second head, a second motor, means for rotatively driving the second head from the second motor, a control element on the second head effective to deenergize the second motor through engagement with the first head and positioned to establish such engagement responsive to rotation of the second head against the first head, a third motor for rotatively driving the work, a rotative control element for the third motor, mechanism for driving the last-mentioned element from the third motor, means actuable by such element responsive to its rotation for stopping the third motor, and mechanism establishing and maintaining a required angular relation between the two specified control elements.

12. A universal balance testing machine as set forth in claim 11, said control element on the second head being an electrical contact, a circuit including such contact and closed by engagement of such contact with the first head, a relay in such circuit, and a circuit including the second motor and broken by energization of the relay.

13. A universal balance testing machine, comprising a work carrier and a universal pivot mounting such carrier, such pivot affording the carrier an angular deflection determined in degree and radial direction by the moment of any unbalance of the work, a tool reciprocatory to remove excess material from an unbalanced work-piece on said carrier, means for automatically regulating the effective stroke of such tool according to the degree of angular deflection of the carrier, a motor, mechanism driven by said motor for rotating the work about a vertical axis determined by said pivot, and means controlled by the radial direction of angular deflection of the carrier for automatically deenergizing the motor when the radius of the moment of unbalance of the work intersects the axis of reciprocation of said tool, responsive to rotation of the work.

14. A universal balance testing machine, comprising a balancing unit including a work carrier, a universal pivot mounting such unit, and affording the unit an angular deflection proportioned to the moment of work unbalance, means for relieving such pivot of load during placement of work on and its removal from the carrier, means for immobilizing the deflected unit, a tool reciprocatory to and from the work for removing material inducing unbalance, means for actuating such tool in its reciprocation, means for regulating the effective stroke of said tool according to the degree of deflection of the immobilized unit, and means for energizing the several specified means in a predetermined time relation.

15. A universal balance testing machine, comprising a balancing unit including a work carrier, a universal pivot mounting such unit and affording the unit an angular deflection proportioned to the moment of work unbalance, means for relieving such pivot of load during placement of work on and its removal from the carrier, means for immobilizing the deflected unit, a motor and means for rotatively driving the work from the motor, means for stopping the motor and thereby disposing the radius of work unbalance in a predetemined rotative position, such means being controlled by the radial direction of deflection of the immobilized unit, and means for energizing the several specified means in a predetermined time relation.

16. A universal balance testing machine, comprising a balancing unit including a work carrier and a support rigidly downwardly extending from such carrier, a universal pivot mounting the unit and affording it an angular deflection proportioned to the moment of work unbalance, means for immobilizing the unit in any position of such deflection, a tool movable to and from the work for correcting unbalance, means for actuating such tool, means for rotating the work to dispose its radius of unbalance in a required relation to such tool, a first control head fixed on said support to participate in any deflection of the balancing unit, a second control head slidable to engage or disengage the first control head and rotatable against the first control head, one of said heads having a circular periphery and the other head presenting to such periphery a substantially frusto-conical face, means for guiding the second head in its sliding travel, means for definitely limiting retraction of the second head from the first head, means for actuating the second head both slidingly and rotatively, means for gaging the effective stroke of said tool according to sliding travel of said second head, and means to regulate rotation of the work according to rotative actuation of the second head.

17. A universal balance testing machine comprising a work carrier, a universal pivot mounting the carrier, and establishing a fixed vertical axis and also an axis of equilibrium for the carrier and its load, such axes coinciding when the loaded carrier is in balance, a first control head disposed at said axis of equilibrium, means rigidly connecting such head to the work carrier, a second control head slidable up and down along said fixed axis to engage and disengage the first head, means for guiding the second head in its sliding travel, means for limiting retraction of the second head from the first head and thus determining a maximum available clearance between the heads, the travel afforded the second head by the first head varying according to the divergency of said axes, means for clamping the work carrier and first head in any deflected position thereof induced by an unbalanced workpiece, means for gaging the moment of unbalance of such a work-piece, and a mechanism for actuating the second head in its sliding travel and proportionately actuating an element of said mechanism.

18. In a universal balance testing machine as set forth in claim 17, a motor for actuating the second head in its sliding travel, and means for energizing said motor responsive to actuation of said clamping means.

19. In a universal balance testing machine as set forth in claim 17, a member slidable along said fixed axis for alternatively applying the carrier load to the universal pivot or relieving the pivot of such load, and means for automatically energizing said clamping means responsive and subsequent to an application of the carrier load to the pivot.

20. A universal balance testing machine comprising a work carrier, a universal pivot mounting the carrier and establishing a fixed axis and also an axis of equilibrium for the carrier and its load, such axes coinciding when the loaded carrier is in balance, a tool for correcting unbalance of a work-piece, an adapter mounted on the carrier to receive a work-piece, and rotative to present to said tool a radius of work unbalance, a motor for rotating said work-piece and thus rotating the adapter, a control device for starting and stopping the motor, an arm rotative to engage said control device for stopping said motor, a gear train for driving said arm, the initial gear of said train being fixed on the adapter, and means adapting another gear of said train to be moved between positions in which it is fully intermeshed and partially intermeshed with said initial gear, whereby any clashing of said gears is avoided.

21. A universal balance testing machine as set forth in claim 20, said motor being electrical and said control device being an electric switch.

References Cited in the file of this patent

UNITED STATES PATENTS

| | | |
|---|---|---|
| 2,359,470 | Eddison | Oct. 3, 1944 |
| 2,636,382 | Martin | Apr. 28, 1953 |